US007298492B2

(12) United States Patent
Tixier

(10) Patent No.: US 7,298,492 B2
(45) Date of Patent: Nov. 20, 2007

(54) METHOD AND SYSTEM FOR ON-LINE MEASUREMENT OF THICKNESS AND BIREFRINGENCE OF THIN PLASTIC FILMS

(75) Inventor: Sebastien Tixier, North Vancouver (CA)

(73) Assignee: Honeywell International Inc., Morristown, NJ (US)

( * ) Notice: Subject to any disclaimer, the term of this patent is extended or adjusted under 35 U.S.C. 154(b) by 261 days.

(21) Appl. No.: 11/025,132

(22) Filed: Dec. 29, 2004

(65) Prior Publication Data
US 2006/0139655 A1    Jun. 29, 2006

(51) Int. Cl.
*G01B 9/02* (2006.01)
(52) U.S. Cl. .................. 356/491; 356/492; 356/503; 356/487
(58) Field of Classification Search ............... 356/504, 356/637, 630, 419, 320, 492, 503, 487; 205/559.28
See application file for complete search history.

(56) References Cited

U.S. PATENT DOCUMENTS

| | | | | |
|---|---|---|---|---|
| 3,902,805 | A | * | 9/1975 | Redner .................. 356/33 |
| 4,909,630 | A | * | 3/1990 | Gawrisch et al. .......... 356/364 |
| 5,268,135 | A | | 12/1993 | Sasaki et al. ............. 264/210.7 |
| 5,365,067 | A | * | 11/1994 | Cole et al. .............. 250/341.8 |
| 5,552,011 | A | | 9/1996 | Lin ..................... 156/244.17 |
| 5,864,403 | A | * | 1/1999 | Ajji et al. .............. 356/365 |
| 5,912,060 | A | | 6/1999 | Kishida et al. ........... 428/35.2 |
| 6,097,488 | A | * | 8/2000 | Grek et al. .............. 356/364 |
| 6,174,655 | B1 | | 1/2001 | Shirokura et al. .......... 430/496 |
| 6,190,153 | B1 | * | 2/2001 | Tsuzukiyama et al. ...... 425/135 |
| 6,281,679 | B1 | | 8/2001 | King et al. .............. 324/229 |
| 6,379,605 | B1 | | 4/2002 | Lin ..................... 264/414 |
| 6,459,488 | B1 | | 10/2002 | Heffner ................. 356/504 |
| 6,515,746 | B2 | | 2/2003 | Opsal et al. ............. 356/369 |
| 6,556,306 | B2 | | 4/2003 | Jiang et al. ............. 356/517 |
| 6,573,999 | B1 | | 6/2003 | Yang ................... 356/517 |
| 6,611,330 | B2 | * | 8/2003 | Lee et al. ............... 356/369 |
| 6,646,752 | B2 | | 11/2003 | Chen et al. .............. 356/632 |
| 6,985,227 | B2 | * | 1/2006 | Wang ................... 356/364 |
| 2003/0089450 | A1 | | 5/2003 | Lin ..................... 156/244.17 |
| 2003/0099823 | A1 | | 5/2003 | Lin ..................... 428/317.9 |
| 2004/0096744 | A1 | | 5/2004 | Sadamitsu et al. ......... 429/254 |
| 2004/0185133 | A1 | | 9/2004 | Araujo et al. ............. 425/533 |

OTHER PUBLICATIONS http://web.archive.org/web/20041125101109/sales.hamamatsu.com/en/products/solid-state-division/ingaas-pin-photodiodes.php☐☐☐☐Hamamatsu Corporation sales site, dated using TheWayBack machine for Nov. 2004.*
U.S. Appl. No. 10/831,074, filed Apr. 24, 2004, Germanenko.

* cited by examiner

*Primary Examiner*—Tarifur Chowdhury
*Assistant Examiner*—Jonathon D Cook
(74) *Attorney, Agent, or Firm*—Munck Butrus, P.C.

(57) ABSTRACT

A system and method for analyzing the characteristics of a thin film is provided whereby the in-plane birefringence of thin films is determined by measuring the interference fringes in the transmission or reflection spectra using unpolarized light and light linearly polarized along the MD and CD directions. The three spectra can be measured simultaneously or sequentially. The in-plane birefringence data can be used to characterize clear polymer films, which are principally made of biaxial oriented polymer, as the film is being continuously fabricated on a production line.

51 Claims, 13 Drawing Sheets

METHOD AND SYSTEM FOR ON-LINE MEASUREMENT OF THICKNESS AND BIREFRINGENCE OF THIN PLASTIC FILMS

FIELD OF THE INVENTION

The invention generally relates to apparatuses and methods for the measurement of thin film properties. Specifically, the invention relates to techniques of measuring the thickness and the in-plane degree of birefringence of plastic films.

BACKGROUND OF THE INVENTION

Generally, in the preparation of plastic films from granular or pelleted polymer resin, the polymer is first extruded to provide a stream of polymer melt, and then the extruded polymer is subjected to the film-making process. Film-making typically involves a number of discrete procedural stages, including melt film formation, quenching, and windup.

An optional part of the film-making process is a procedure known as "orientation." The "orientation" of a polymer is a reference to its molecular organization, i.e., the orientation of molecules relative to each other. Similarly, the process of "orientation" is the process by which directionality (orientation) is imposed upon the polymeric arrangements in the film. The process of orientation is employed to impart desirable properties to films, including making cast films tougher (higher tensile properties). Depending on whether the film is made by casting as a flat film or by blowing as a tubular film, the orientation process requires substantially different procedures. This is related to the different physical characteristics possessed by films made by the two conventional film-making processes: casting and blowing. Generally, blown films tend to have greater stiffness, toughness and barrier properties. By contrast, cast films usually have the advantages of greater film clarity and uniformity of thickness and flatness, generally permitting use of a wider range of polymers and producing a higher quality film.

Orientation is accomplished by heating a polymer to a temperature at or above its glass-transition temperature ($T_g$) but below its crystalline melting point ($T_m$), and then stretching the film quickly. On cooling, the molecular alignment imposed by the stretching competes favorably with crystallization and the drawn polymer molecules condense into a crystalline network with crystalline domains (crystallites) aligned in the direction of the drawing force. As a general rule, the degree of orientation is proportional to the amount of stretch, and inversely related to the temperature at which the stretching is performed. For example, if a base material is stretched to twice its original length (2:1) at a higher temperature, the orientation in the resulting film will tend to be less than that in another film stretched 2:1 but at a lower temperature. Moreover, higher orientation also generally correlates with a higher modulus, i.e., measurably higher stiffness and strength.

When a film has been stretched in a single direction (monoaxial orientation), the resulting film exhibits great strength and stiffness along the direction of stretch, but it is weak in the other direction, i.e., across the stretch, often splitting or tearing into fibers (fibrillating) when flexed or pulled. To overcome this limitation, two-way or biaxial orientation is employed to more evenly distribute the strength of the film in two directions, in which the crystallites are sheet like rather than fibrillar. These biaxially oriented films tend to be stiffer and stronger, and also exhibit much better resistance to flexing or folding forces, leading to their greater utility in packaging applications.

From a practical perspective, it is possible, but technically and mechanically quite difficult, to biaxially orient films by simultaneously stretching the film in two directions. Apparatus for this purpose is known, but tends to be expensive to employ. As a result, most biaxial orientation processes use apparatus which stretches the film sequentially, first in one direction and then in the other. Again for practical reasons, typical orienting apparatus stretches the film first in the direction of the film travel, i.e., in the longitudinal or "machine direction" (MD), and then in the direction perpendicular to the machine direction, i.e., the "cross direction" (CD).

The degree to which a film can be oriented is also dependent upon the polymer from which it is made. Polypropylene, as well as polyethylene terephthalate (PET), and NYLON, are polymers which are highly crystalline and are readily heat stabilized to form dimensionally stable films. In the plastics industry, common biaxial oriented or "biax" films include MYLAR (biaxial oriented polyester or BOPET), NYLON (biaxial oriented polyamide or BOPA), and biaxial oriented polypropylene (BOPP). Biaxial oriented polymeric films and methods of fabricating them are known in the art and are described, for example, in U.S. Pat. No. 6,379,605 to Lin, U.S. Pat. No. 6,174,655 to Shirokura, et al., U.S. Pat. No. 5,912,060 to Kishida, et al., U.S. Pat. No. 5,552,011 to Lin, and U.S. Pat. No. 5,268,135 to Sasaki et al., which are incorporated herein by reference.

On-line measurements of the thickness, basis weight, and molecular orientation of plastic films can be employed to control the process of fabricating biaxial oriented plastics. Orientation within a film can be described by the index of refraction ellipsoid, which is defined by the indices of refraction along the three axial directions, i.e., machine direction, cross-direction and thickness. Birefringence is the difference between two of these refraction indices. In thin films, birefringence of particular interest is the in-plane birefringence, which is defined as the difference between the indices of refraction along the machine direction (MD) and the cross-direction (CD). Birefringence in polymers is a result of the anisotropy in the molecular orientation. Such anisotropy occurs in the biax fabrication process wherein stretching of the film leads to molecular orientation in the machine and cross directions.

An optical technique for determining thickness measures the amounts of light absorbed by a sample in two or more wavelength bands of the infrared (IR) spectrum. In the simplest case, two bands are used, a measure band and a reference band. The measure band is selected to coincide with a strong absorption in the target material (film to be measured), and the reference band is selected to match a weakly absorbing region of the target material.

The transmission measurement is based on Beer's Law, which states $I=I_0 e^{-\mu w}$, where $I_0$ is the signal with no sample, $I$ is the signal with sample, $\mu$ is the absorption coefficient, and $w$ is the weight of the sample. Equivalently, this may be written as $w=(1/\mu) \ln(I_0/I)$. Thus for a given wavelength of IR radiation, the weight, or thickness of the film, is proportional to the logarithm of the attenuation.

In practice the accuracy of such transmission techniques is limited when measuring in the thin film regime due to an interference fringing effect. Fringes in the transmission and reflection spectra of the measured film appear due to interference of the light reflected from the film surfaces with light transmitted through the film. An example is illustrated in FIG. 1, which shows interference fringes 31 forming when the transmission of a 16 µm polyamide film is measured at different wavelengths. As a result, the sensor calibration error for such films increases significantly making measurements inaccurate. The lower limit for the film thickness is about 15-30 microns and depends on the material of the film.

To understand the fringing effect, consider a thin film with thickness d and index of refraction $n_2$, deposited on another material as shown in FIG. 2. Both the top and bottom of the film will reflect a portion of the light. The total amount of transmitted light contains contributions from these multiple reflections. Because of the wavelike nature of light, the reflections from the two interfaces may add together constructively or destructively, depending on their phase relationship. Their phase relationship is determined by the difference in the optical path lengths of reflections from these two interfaces, which in turn is determined by the thickness of the film d and the index of refraction n. Reflections are in-phase and therefore add constructively when the light path is equal to an integral multiple of the wavelength of light. For light perpendicularly incident on a film, this occurs when $2nd=i\lambda$, where d is the thickness of the film, i is an integer, and $\lambda$ is the free space wavelength of the incident radiation. Conversely, reflections are out of phase and add destructively when the light path is half of a wavelength different from the in-phase condition, or when $2nd=(i+\frac{1}{2})\lambda$.

Qualitatively, these multiple reflections result in a transmission amplitude with a $\cos(4\pi nd/\lambda)$ component, or a transmitted intensity given by:

$$I=B_0+A_0\cos(4\pi nd/\lambda). \qquad (1)$$

The reflected intensity will have a similar periodic component.

From this it is apparent that the transmittance will vary periodically with wave number $2\pi/\lambda$. Furthermore, at a given wavelength (index of refraction n is wavelength dependent) the frequency of oscillations is proportional to film thickness d. The transmitted light can be detected by sensors located on the opposite side of the film. A fit of the transmission spectra to Eq. 1 will give the thickness d assuming that $n(\lambda)$ is known.

Because the spectral position of the fringes depend on the film thickness, there have been efforts to extend current transmission sensors into the thin film regime by measuring interference fringes and extracting the film thickness from the fringe parameters.

In on-line monitoring applications, birefringence is usually obtained directly by measuring the optical retardation using polarimetry techniques. Such a technique is described in U.S. Pat. No. 5,864,403 to Ajji, et al. Retardation is the product of birefringence and thickness of a material. Therefore, it decreases with decreasing birefringence and with decreasing thickness. In the limit of very thin films (below 20-30 µm), retardation is difficult to measure. This is due to the fact that it becomes small and that interference fringes can affect the measurement. The present invention is directed to the use of interference fringes for the measurement of birefringence of thin films.

SUMMARY OF THE INVENTION

The present invention is based in part on the development of a technique for measuring the in-plane birefringence of thin films by measuring interference fringes in the transmission or reflection spectra using unpolarized and light linearly polarized along the MD and CD directions.

The invention can be implemented in thin film and birefringence sensors that are employed to characterize clear polymer films, which are principally made of biaxial oriented polymer, that are continuously fabricated on production lines.

In one embodiment, the invention is directed to a method of analyzing one or more characteristics of a film, which is moving in a machine direction, said method including the steps of:

(a) providing a broadband source of radiation that creates a probe beam;

(b) directing the probe beam along a beam path onto or through the film such that the probe beam is reflected from the film to form a first output beam or is transmitted through the film to form a second output beam;

(c) providing an analyzer to determine the intensity of the first output beam or the second output beam at desired wavelengths or wavelength bands;

(d) positioning a neutral density filter, a first polarizing filter, or a second polarizing filter in the beam path such that the neutral density filter, the first polarizing filter, or the second polarizing filter is located in the beam path between the broadband source of radiation and the analyzer; and (e) utilizing differences in the spectral fringes of unpolarized and linearly polarized light to calculate birefringence characteristics of the film.

In another embodiment, the invention is directed to a system for analyzing one or more characteristics of a film, that is moving in a machine direction, the system including:

(a) a broadband source of radiation that creates a probe beam;

(b) means for directing the probe beam along a beam path onto the film such that the probe beam is reflected to form a first output beam or such that the probe beam is transmitted through the film to form a second output beam;

(c) analyzer means for determining the intensity of the first output beam or the second output beam at desired wavelengths or wavelength bands;

(d) a first polarizing filter;

(e) a second polarizing filter wherein the first polarizing filter has a direction of linear polarization that is parallel to the machine direction and the second polarizing filter has a direction of linear polarization that is perpendicular to the machine direction, wherein the first polarizing filter and the second polarizing filter are located between the broadband source of radiation and the analyzer means; and (f) calculation means for utilizing differences in the spectral fringes of unpolarized and linearly polarized light to calculate birefringence characteristics of the film.

In a preferred technique for thickness and birefringence measurements of thin films, spectra of transmitted or reflected light that is measured simultaneously with unpolarized light, linearly polarized light along the MD direction, and linearly polarized light along the CD direction is generated. Thickness and birefringence values can thus be ascertained at specific points along a moving web of plastic film.

In another technique, which is especially applicable when the production process is in steady state, the thickness and birefringence profiles of the web are obtained by measurements using (i) unpolarized light, (ii) linearly polarized light along the MD direction, and (iii) linearly polarized light in the CD direction. Only one analyzer is required when the measurements are performed sequentially.

DETAILED DESCRIPTION OF THE PREFERRED EMBODIMENTS

In accordance with the invention, a novel infrared (IR) film measurement system is provided. The invention is based, in part, on the recognition that the only requisite for thickness measurements is the directional average (along MD and CD directions) index of refraction in the wavelength range of measurement. A very good estimate of this index value can be obtained from the literature. A more accurate value can be obtained during calibration on-line with an unpolarized light source or in a laboratory using commercial products.

Once the thickness of the film is determined, the indices of refraction $n_{MD}$ and $n_{CD}$ in the MD and CD directions respectively, can be obtained by measuring the spectrum of linearly polarized light transmitted through or reflected by the film. For the MD and CD index, the light is linearly polarized in the MD and CD direction, respectively. The transmission spectra have the following forms.

$$I_{MD}=B_1+A_1\cos(4\pi n_{MD}d/\lambda). \tag{3}$$

$$I_{CD}=B_2+A_2\cos(4\pi n_{CD}d/\lambda). \tag{4}$$

Fitting measured data to Eqs. 3 and 4, yields $n_{MD}$ and $n_{CD}$, assuming that the thickness d is known from the measurement using unpolarized light. The in-plane birefringence is defined as $\Delta=n_{MD}-n_{CD}$, or the difference of the MD and CD indices of refraction. It should be noted that $n_{MD}$ and $n_{CD}$ are assumed to have the same wavelength dependence as the average index. Thus, this fringe measurement technique can be employed to measure birefringence in the thin film regime.

It has been assumed that as a consequence of the stretching process the axes of the refractive index ellipsoid of the film are oriented along the MD, CD and normal directions. Polarization of linear polarized light in the CD or MD direction is thus unchanged by transmission through the film. Effect of retardation or double refraction of the unpolarized beam is considered negligible due to the very thin nature of the film.

FIGS. 3-7 illustrate various embodiments of the invention wherein unpolarized and linearly polarized light are employed to measure the difference in spectral fringes from thin films to determine their thickness and in-plane birefringence. The process is particularly suited for clear plastic films that are typically less than 1 μm to 50 μm and preferably less than 1 μm to 20 μm thick. When implemented sequentially, the process only requires one analyzer. When performed simultaneously, the process preferably employs three analyzers. The analyzer typically has a working spectral range of from 400 nm to 5000 nm.

As the sensor is scanned across the web, i.e. in the CD direction, the thickness and birefringence profiles of the film are obtained. The basis weight profile can also be calculated using the known density of the plastic.

Figure 1:
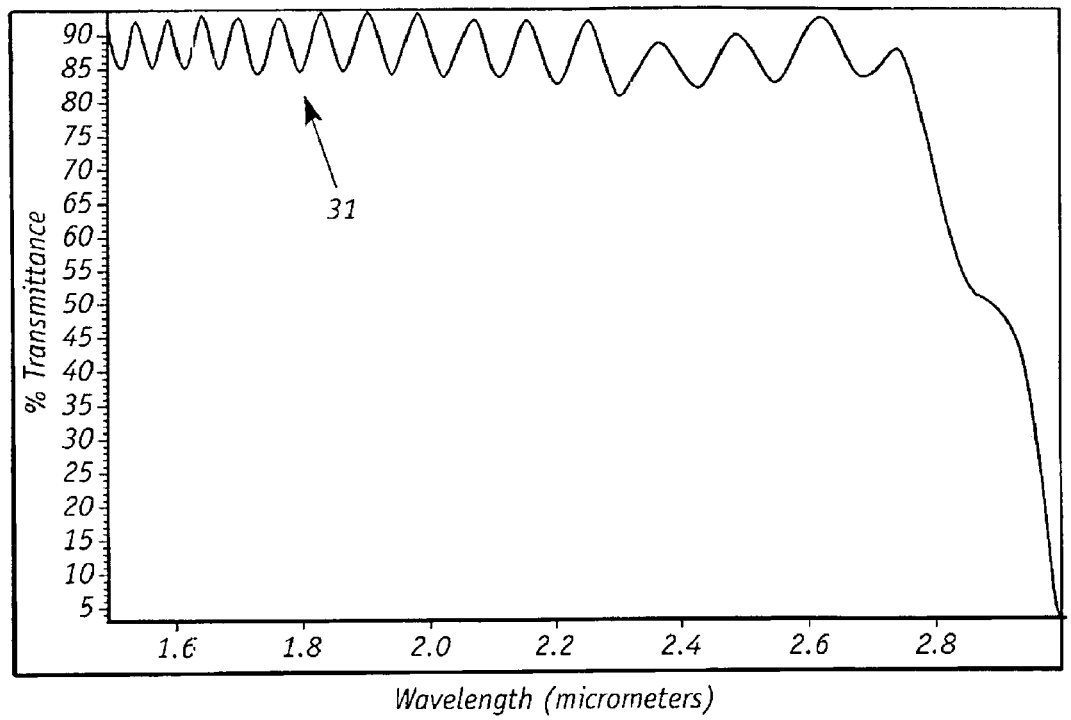
FIG. 1 is a graph of measured percentage transmission of unpolarized radiation vs. wavelength for a 16 μm thick polyamide (NYLON) film which shows interference fringes.
Figure 2:
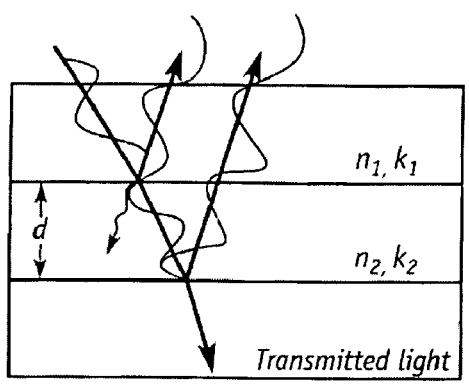
FIG. 2 shows a basic concept diagram of a light wave passing through a thin film with thickness d.
Figure 3A:
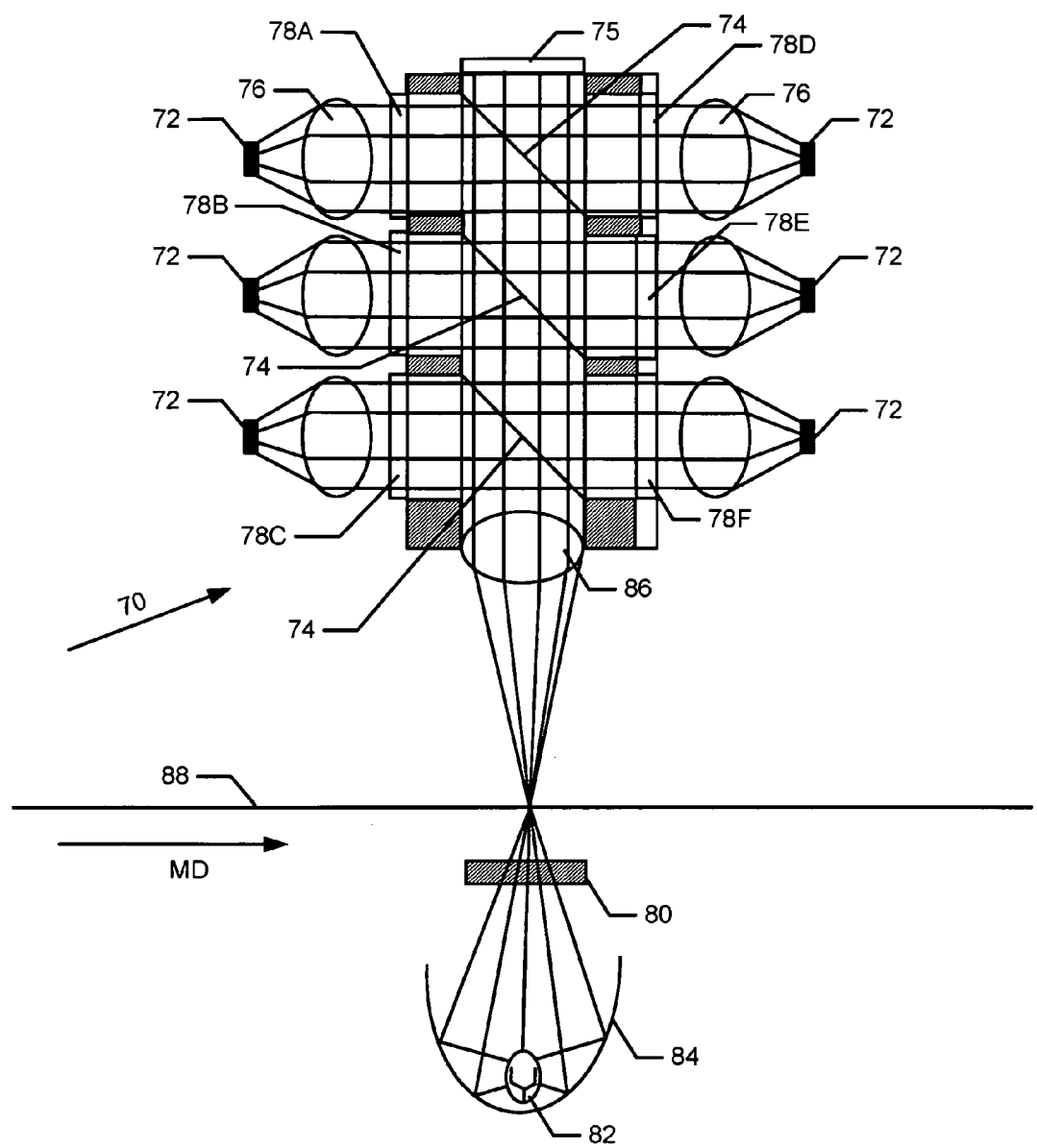
FIG. 3A shows a schematic drawing of the system with a multichannel detector assembly and polarizing filters positioned between the source beam and the web where the (i) filters and source beam and (ii) assembly are on opposite sides of the web.

As illustrated in FIG. 3A, a system for analyzing a characteristic of the film includes an analyzer that comprises a multichannel detector 70 that is positioned on one side, e.g., above, the web 88 of thin, mostly clear plastic, for example, which moves in the machine direction (MD). The cross direction (CD) is transverse to the MD. The multichannel detector 70 includes a body in which three beam splitters 74 are positioned. Each optical channel comprises a detector 72, lens 76, and associated an IR band selection filter. The six filters are designated as 78A, 78B, 78C, 78D, 78E, and 78F. These filters are typically interference filters that have a spectral transmission band surrounded by two blocking bands that allow only a portion of the spectrum to pass. This result in high transmission centered about the chosen wavelength. At the distal portion of the detector 70 is a mirror 75 and at the proximal or entrance end is a focusing lens 86. In this diagram only six optical channels are shown for clarity; the detector can have additional optical channels and corresponding detectors. Suitable detectors 72 include photoconductive or photovoltaic detectors that have an element that is formed from PbS, PbSe, InGaAs, Si, mercury cadmium telluride (MCT), InAs, Ge, and InSb.

Figure 7:
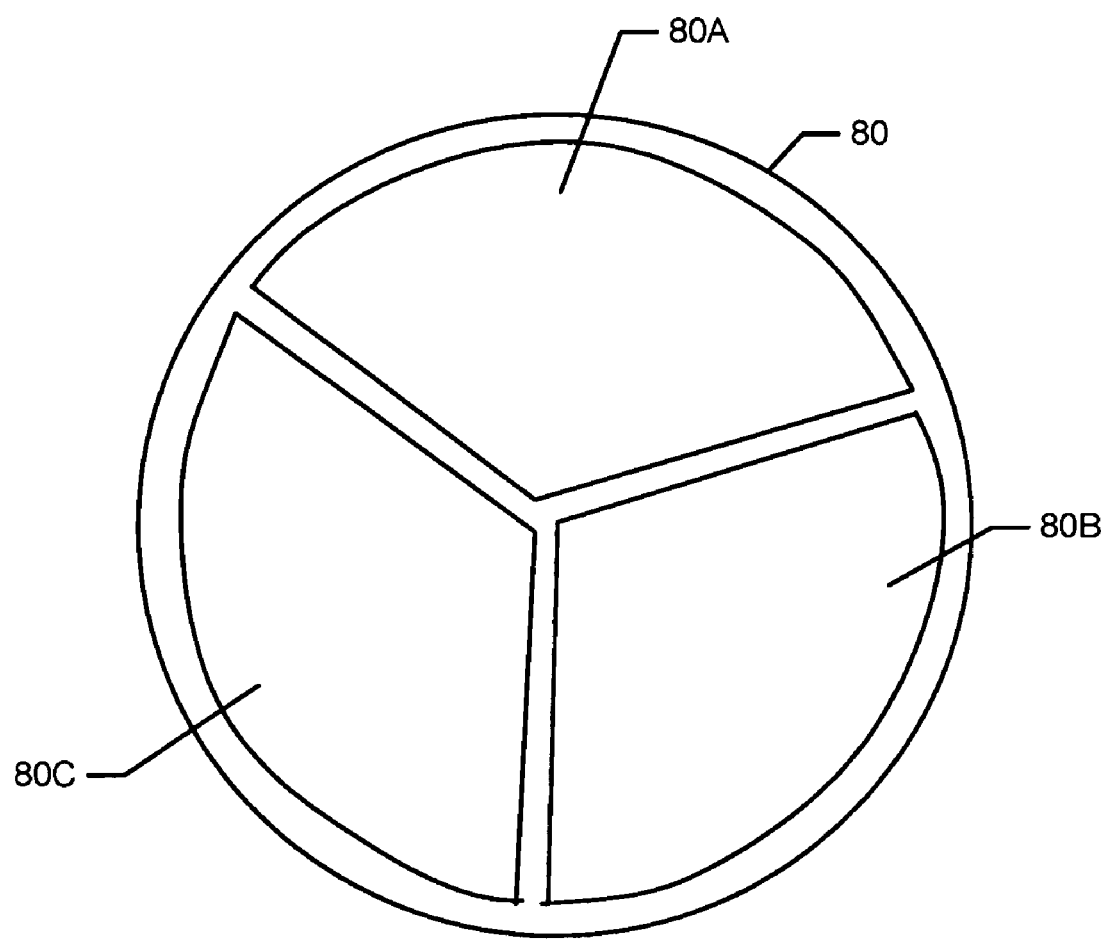
FIG. 7 illustrates a polarizing filter wheel including a neutral density filter, a first linear polarizing filter and a second linear polarizing filter.

As further shown in FIG. 3A, the system further includes a source IR radiation 82 and a parabolic mirror 84 for focusing the light from the source to create a probe beam. A polarizing filter wheel 80 is positioned so that the probe beam passes through the polarizing filter wheel before reaching the moving web 88. As shown in FIG. 7, the polarizing filter wheel 80 includes first and second linear polarizing filters 80A, 80B, and a neutral density filter 80C. The polarizing filter wheel 80 includes a mechanism that rotates the wheel so that the filters 80A, 80B, or 80C can be inserted between the radiation source 82 and the web 88 at predetermined intervals, i.e. after every acquisition or after a CD scan or after many CD scans. Light passing through filter 80A is preferably linearly polarized in a direction of linear polarization that is parallel to the machine direction and light passing through filter 80B is preferably linearly polarized in a direction of linear polarization that is in the CD, i.e., that is perpendicular to the machine direction. The neutral density filter 80C reduces or attenuates the intensity of the radiation that passes through but leaves the radiation unpolarized. As used herein, the term "neutral density filter" is meant to encompass an open aperture as well where there is zero reduction in intensity. Using a neutral density filter that reduces the intensity is preferred as opposed to the case where the neutral density filter is an opening. The latter situation can be employed, for example, if electronic gain can be adjusted by appropriate software.

Figure 3B:
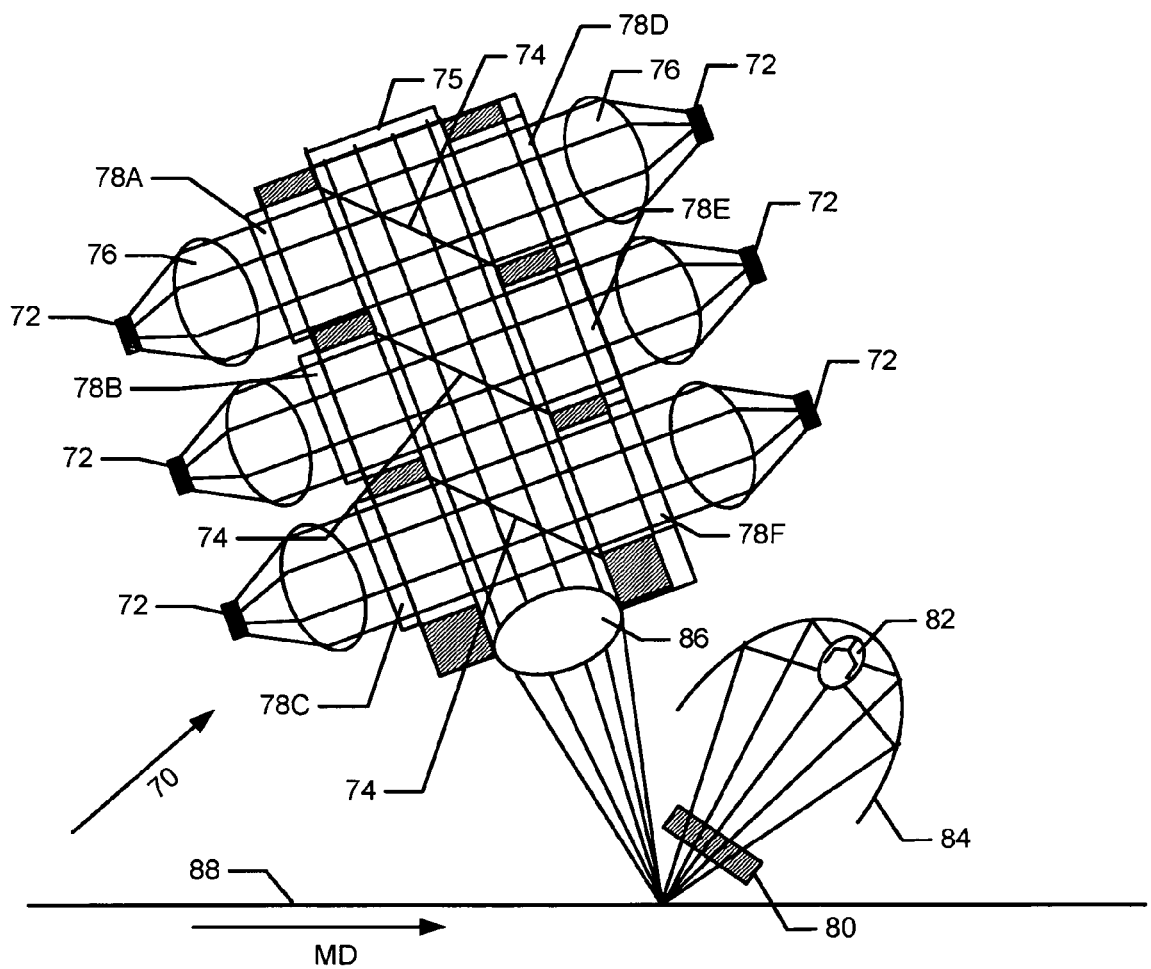
FIG. 3B shows a schematic drawing of the system with a multichannel detector assembly and polarizing filters positioned between the source beam and the web where the (i) filters and source beam and (ii) assembly are on the same side of the web.

When the radiation source 82 is positioned below the moving web 88 as shown in FIG. 3A, the multichannel detector 70 measures the transmittance through the web 88. Alternatively, as shown in FIG. 3B, when the radiation source 82 is located on the same side as the multichannel detector 70, radiation that is reflected from the moving web 88 is measured.

In operation, broadband radiation from the IR source 82 is reflected from the parabolic mirror 84 to form a collimated probe beam that passes through polarizing filter wheel 80 before being incident on the web 88. The radiation that emerges from the web 88, either transmitted or reflected radiation, is focused by lens 86 into the multichannel detector 70 where the beam is separated into a plurality of parallel beams by the beam splitters 74. Each parallel beam passes through a narrow bandpass filter, e.g., 72A, before reaching a detector 72. As the polarizing filter wheel 80 rotates, the linear polarizing filters 80A, 80B, or the neutral density filter 80C is inserted into the path of the probe beam at predetermined time intervals which can be the same. It should be noted that the order that the filters 80A, 80B, and 80C is inserted sequentially is a matter of design choice. That is the polarizing filter wheel 80 can be rotated clockwise or counter-clockwise. The birefringence, thickness, and other characteristics of the web 88 can be calculated using the differences in the spectral fringes of unpolarized and linearly polarized light.

Due to large thickness variability in the MD direction of the web, it is preferred to employ fast detectors with high signal to noise ratio such as InGaAs detectors and to use fast chopping frequency or modulated Super Luminescent Diodes (SLDs) for the IR source.

Figure 4A:
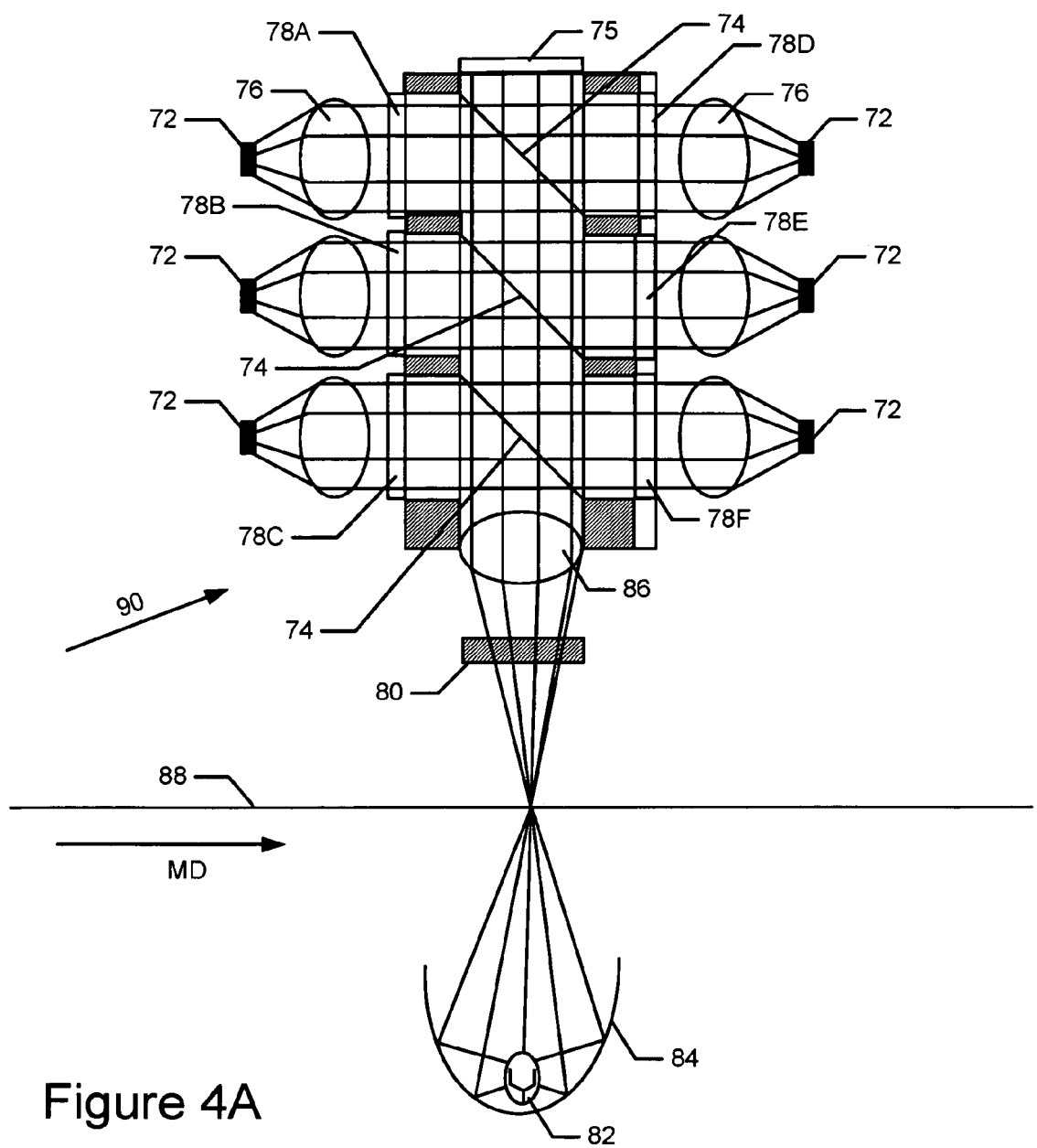
FIG. 4A shows a schematic drawing of the system with polarizing filters between the web and the multichannel detector assembly where the source beam and assembly are on opposite sides of the web.
Figure 4B:
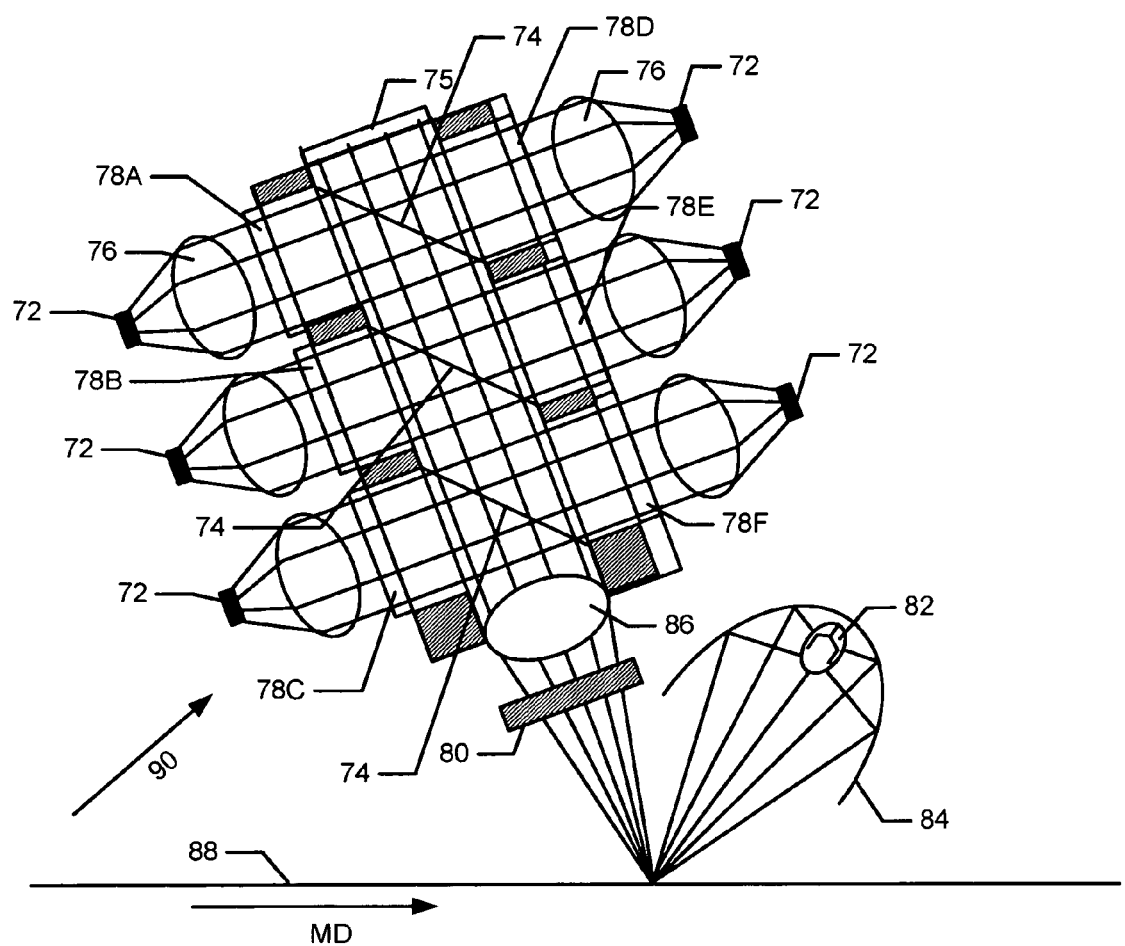
FIG. 4B shows a schematic drawing of the system with polarizing filters between the web and the multichannel detector assembly where the source beam and assembly are on the same side of the web.

FIGS. 4A and 4B illustrate another configuration of a multichannel detector 90 wherein a polarizing filter wheel 80 is positioned between the moving web 88 and the detector 90 along the probe beam path from the radiation source 82. The system is essentially the same as that shown in FIGS. 3A and 3B, in that it includes a multichannel detector 90 that is positioned one side of the moving web 88 with a source of radiation 82 that can be positioned on either of the moving web 88. In this embodiment, the polarizing filter wheel 80 is positioned in front of lens 86 along the path of the probe beam so that either transmitted (FIG. 4A) or reflected (FIG. 4B) radiation that emerges from the moving web 88 will pass through the polarizing filter wheel 80 before entering the multichannel detector 90. Operation of the system is essentially the same as well.

FIGS. 5A, 5B, 6A, and 6B illustrate embodiments of the invention in which the analyzer includes one or more spectrometers. Diffraction grating type spectrometers are preferred. Using spectrometers obviates the need for individual bandpass filters and detectors. A spectrometer measures the full spectrum in a given wavelength range. The typical number of individual wavelength bands in a spectrometer is, for example, 256,512, or higher.

Figure 5A:
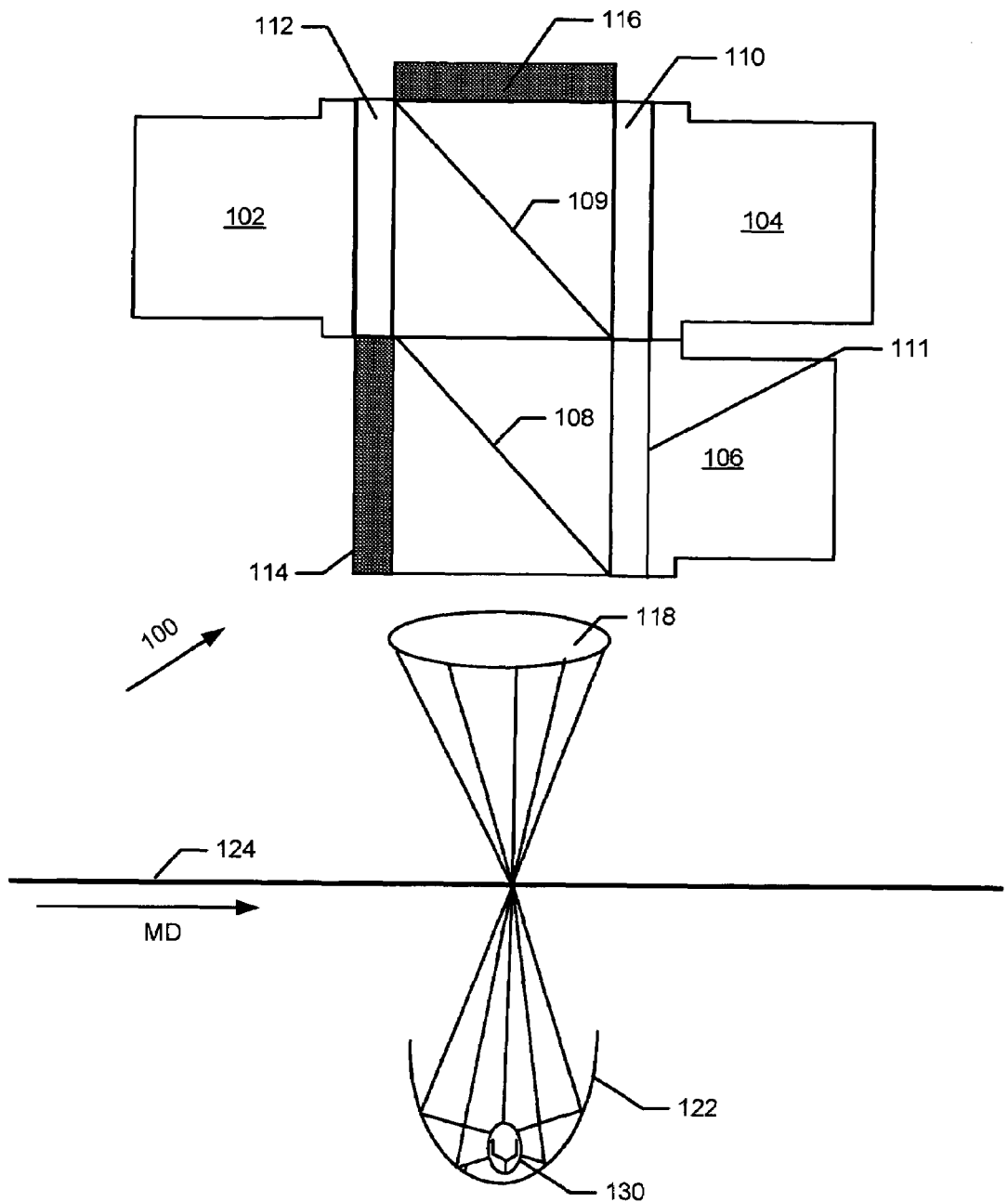
FIG. 5A shows a schematic drawing of a system wherein three spectrometers are used for simultaneous measurements where the source beam and assembly are on opposite sides of the web.
Figure 5B:
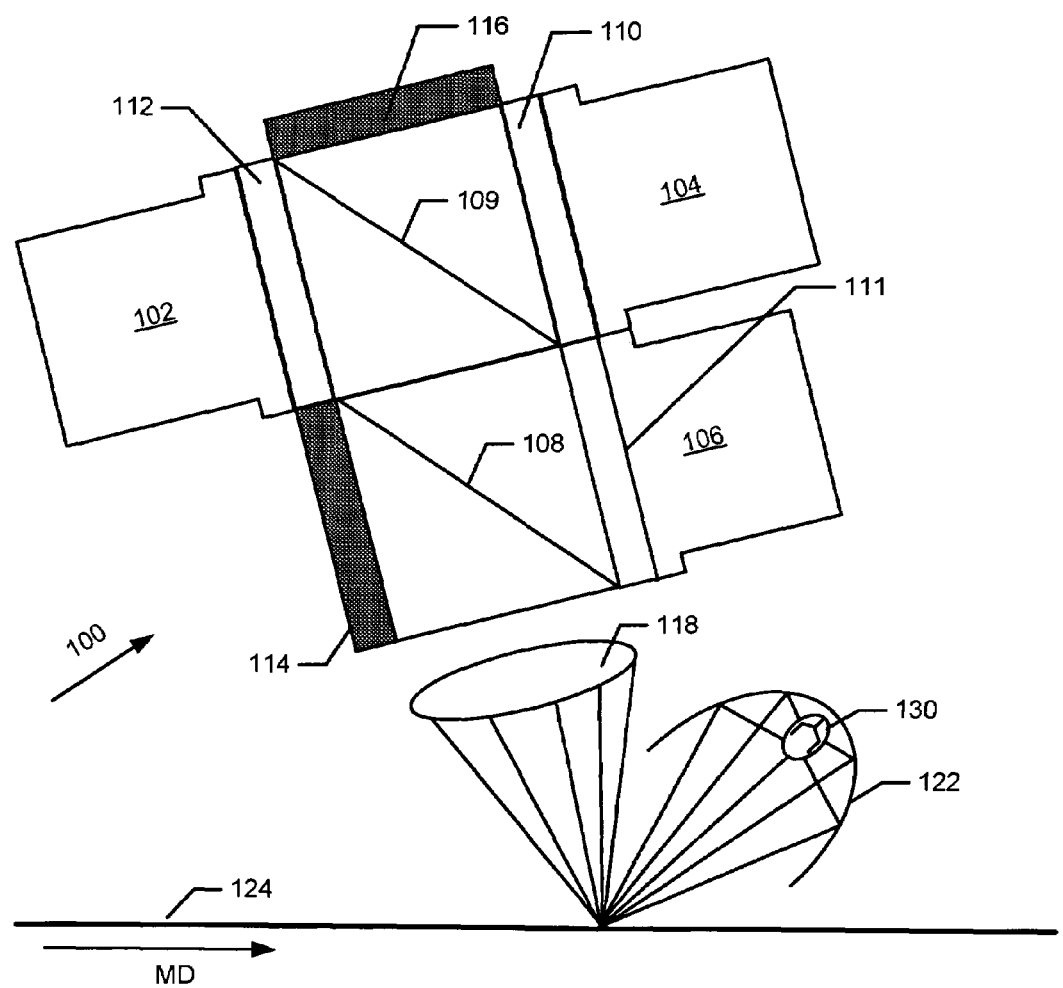
FIG. 5B shows a schematic drawing of a system wherein three spectrometers are used for simultaneous measurements where the source beam and assembly are on the same side of the web.

In the system shown in FIGS. 5A and 5B, three spectrometers are used so that fringe patterns are recorded simultaneously for unpolarized light and linearly polarized light in the MD direction and linearly polarized light in the CD direction. In this fashion, all measurements are performed on the same spot on the moving web 124. Specifically, as shown, the system includes a detector assembly 100 that has two beam splitters 108 and 109 which are positioned along the middle channel and three optical channels that house spectrometers 102, 104 and 106. Mirrors 114 and 116 reflect light back into the middle channel. Positioned in front of spectrometers 102, 104, and 106 are a linear polarizing filter 112, a linear polarizing filter 110, and a neutral density filter or aperture 111, respectively. The system 100 further includes a source of IR radiation 130 and a parabolic mirror 122. The source of radiation 130 is positioned on the same (FIG. 5B) or on the opposite (FIG. 5A) side of the moving film 124. In either case, radiation that is transmitted through or reflected from the web is focused by lens 118 into the spectrometers. Beam splitter 108 directs a portion of the radiation into spectrometer 106 whereas a portion of light passes to beam splitter 109 which in turn directs light into spectrometers 102 and 104. As is apparent, spectrometer 106 analyzes unpolarized light whereas spectrometers 102 and 104 analyzes light that has passed through linear polarizing filter 112 and 110, respectively. In this system, all three measurements are conducted simultaneously.

In a further embodiment of the invention, source and receiver are on the same side of the web. The reflected intensity, not the transmitted intensity, is measured. Technically the measurement can be done in reflection geometry. This has the advantage of higher fringe visibility. However, it may suffer from sensitivity to sheet flutter.

Figure 6A:
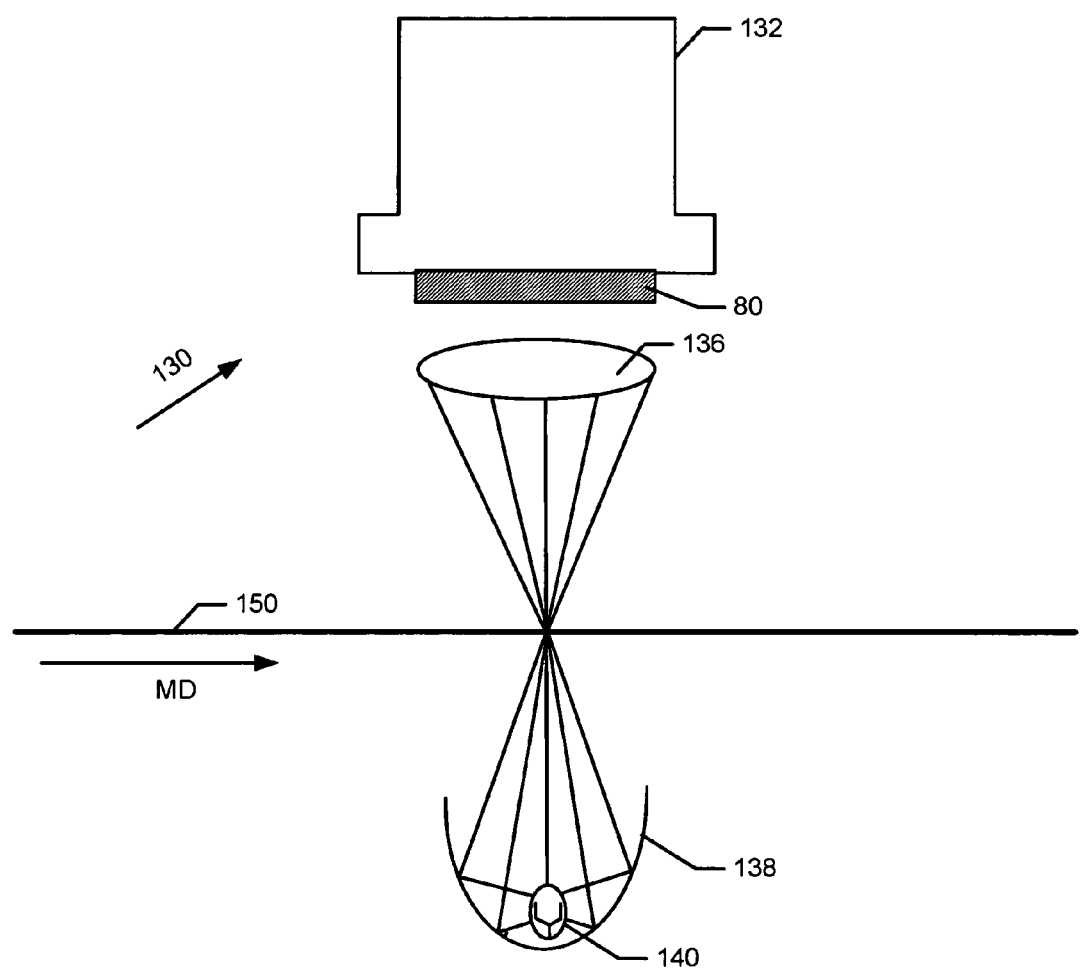
FIG. 6A shows a schematic drawing of the system with a single spectrometer for sequential measurements where the source beam and assembly are on opposite sides of the web.
Figure 6B:
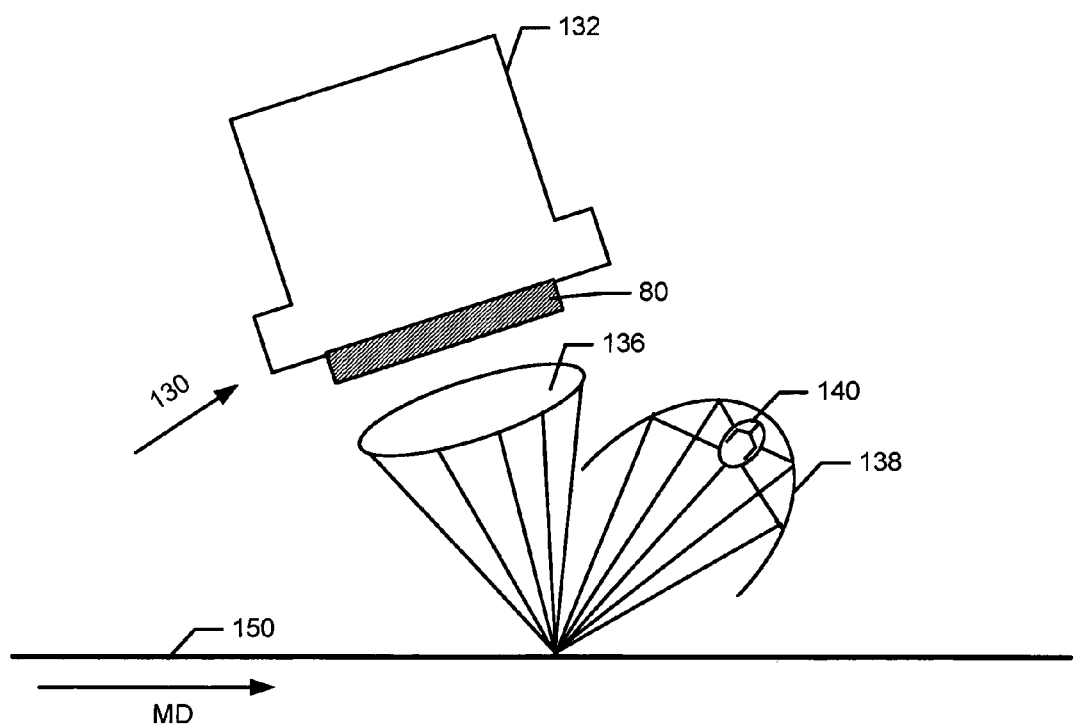
FIG. 6B shows a schematic drawing of the system with a single spectrometer for sequential measurements where the source beam and assembly are on the same side of the web.

FIGS. 6A and 6B illustrate an embodiment of a system 130 that includes a spectrometer 132 and a polarizing filter wheel 80 that filters radiation entering the spectrometer 132. The system 130 also includes a source of IR radiation 140 and an associated parabolic mirror 138. As illustrated, the source of radiation 140 can be positioned on the same side (FIG. 6B) as that of the spectrometer 132, relative to the positioned of the moving web 150, or it can be positioned on the opposite side (FIG. 6A). In either case, radiation that is transmitted through the moving web 150 or which is reflected from the moving web 150 is focused by lens 136 into the polarizing filter wheel 80.

In operation, radiation that emerges from the moving web 150 is collimated by lens 136 and directed toward the rotating polarizing filter wheel 80 so that the linear polarizing filters 80A, 80B, or the neutral density filter 80C is sequentially inserted into the path of the beam of radiation at predetermined time intervals. The birefringence, thickness, and other characteristics of the web 150 can be calculated using the differences in the spectral fringes of unpolarized and linearly polarized light.

FIG. 7 illustrates an embodiment of the polarizing filter wheel which includes a neutral density filter 80A, a first linear polarizing filter 80B, and a second linear polarizing filter 80C. The polarizing filter wheel 80 includes a motor which rotates the wheel a desired speed. In this fashion, a probe beam passes through each of these filters a predetermined timed interval.

Figure 8:
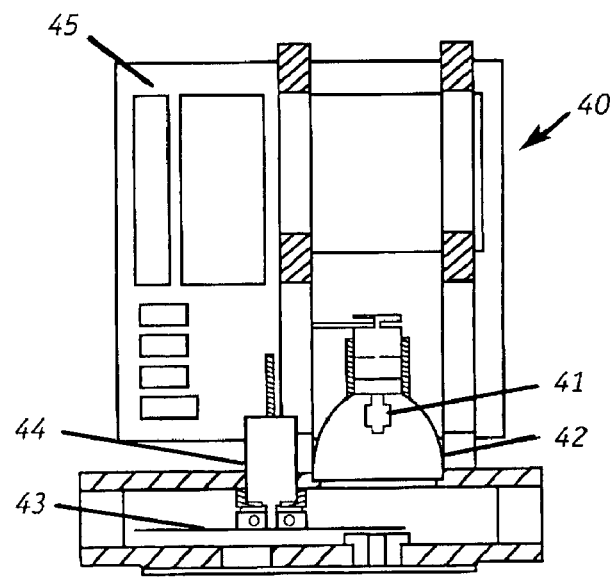
FIG. 8 shows a source assembly of an infrared film thickness measurement system.

FIG. 8 illustrates a suitable IR source assembly 40. An IR source transmits pulses of wideband IR to the sample between the upper and lower heads. It consists of an incandescent light 41, a mirror 42, and supporting hardware for modulating the IR energy. A quartz tungsten halogen lamp is used because of its compact size, and the quartz envelope is transparent to the IR energy in the wavebands of interest in the application. The small filament of the lamp makes it possible to focus most of the energy onto the window. Radiation from the quartz tungsten halogen lamp is focused at a light pipe by the mirror 42. The only adjustment required is the focusing of the lamp by sliding it in the holder to maximize the signal strength at the analyzer or receiver.

The IR energy is modulated with chopper 43, a lightweight rotating stainless steel disc with preferably eight evenly spaced holes. It is driven by a brushless DC motor 44 that modulates the radiation at 620±25 Hz. Modulating the IR energy will prevent the signal received by the detectors in the receiver from being obscured by ambient light or by low frequency noise generated in the detector.

The sample cell, in which the IR energy interacts with the sample to be measured, is located in the space between the IR source and receiver windows. The sample film to be measured is placed here to interact with the IR energy. It is very important that the IR energy transmitted be determined only by the properties of the sample and not by extraneous effects, such as dirt and head misalignment or separation.

Figure 9:
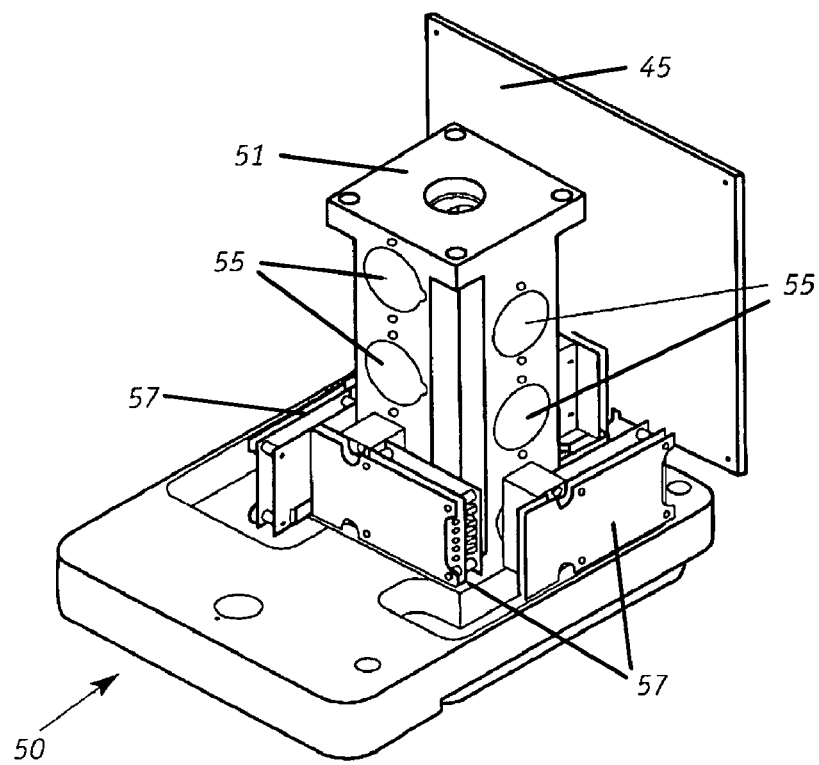
FIG. 9 shows a receiver assembly.

A suitable receiver assembly 50 is shown in FIG. 9. The function of the receiver is to simultaneously read the transmitted energy in all of the selected bands. This is done by using beam splitters (66 in FIG. 10) to separate the energy into a series of parallel beams. Each beam is then passed through a filter designed to pass a predetermined waveband, and the total energy in that band is detected by a photoconductive or photovoltaic detector. Each detector has its own conventional electronics 57 that amplify the received signal, convert it to DC, and transmit it to the receiver.

The receiver assembly 50 has capacity to support up to preferably twelve channels, and can load additional channels as needed. A central aluminum 51 column has sockets 55 that can support up to twelve channels. The central column 51 is mounted to a water-cooled plate in the ceiling (not shown) for cooling the sensors.

Figure 10:
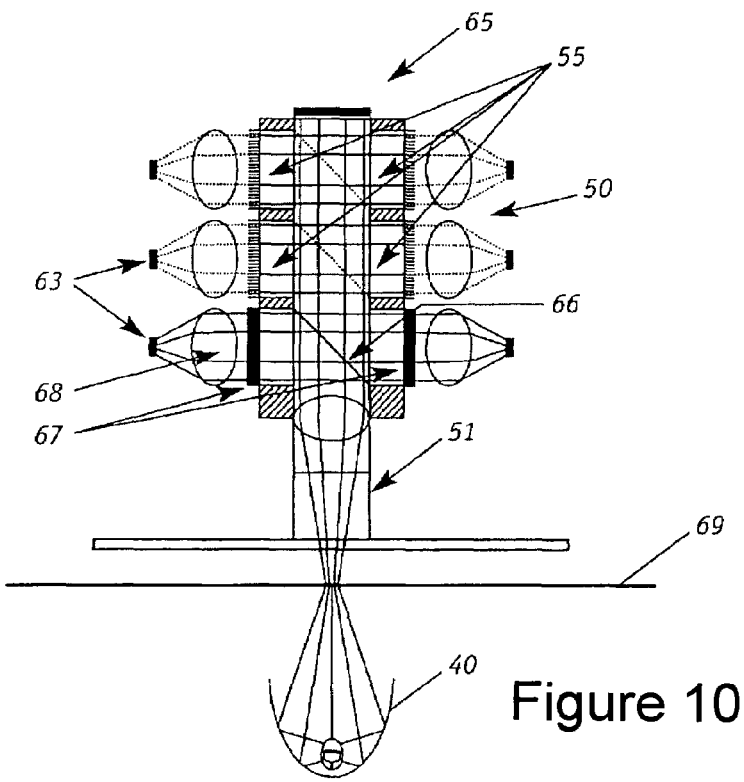
FIG. 10 shows channels mounted to the center column of the receiver assembly.

FIG. 10 shows channels mounted to the center column 65. In the diagram, only 6 channels are shown mounted for clarity. Additional channels can be mounted to the central column 51 at sockets 55 as required. Each channel comprises a detector 63 an IR band selection filter 67, lens 68 and support electronics. In accordance with an embodiment of the invention, up to preferably twelve channels are utilized at once. Heat from the electronics and peltier cooling of detectors is conducted from the detector assemblies through the column 55 to the water-cooled plate.

A thin film sample 69 is loaded and secured in the sample cell, and the IR source 40 operated to transmit pulses of wideband IR through the sample. The receiver reads the transmitted energy in all of the selected bands simultaneously, and the output of each of the detectors is transmitted to the signal processing circuitry 45 (FIGS. 8, 9) to process the signal. The wavelength and transmittance percentage can then be electronically plotted on a graph.

Figure 11:
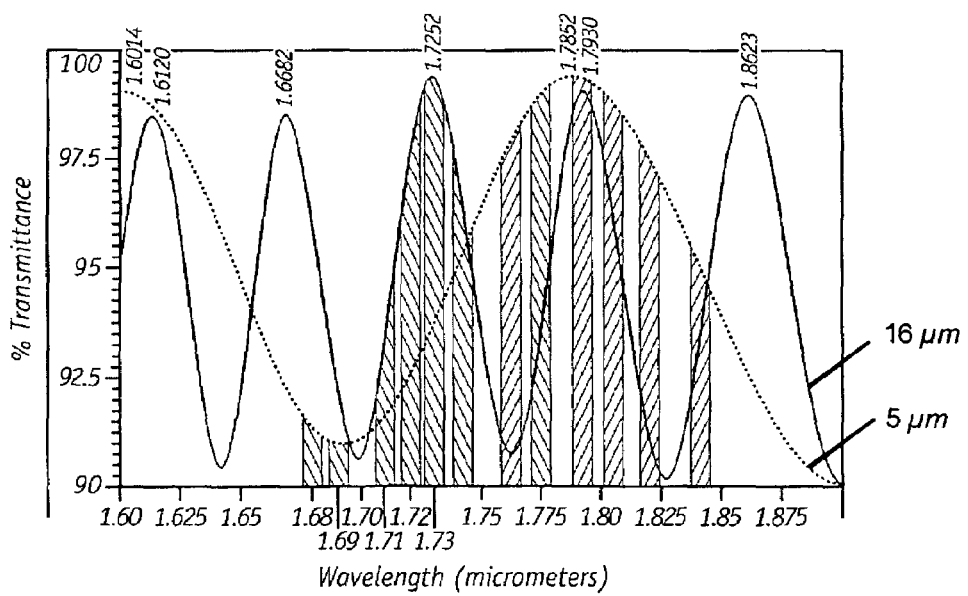
FIG. 11 shows the interference fringes formed from measuring 5 μm and 16 μm NYLON films.

FIG. 11 shows the interference fringes formed from measuring 5 and 16 µm NYLON films with a Fourier Transform Infrared (FTIR) spectrometer. In order to detect the characteristic signature of interference fringes, appropriately chosen optical filters are utilized. The dashed areas under the fringes represent proposed filter wavelengths for a twelve channel IR sensor.

Figure 12:
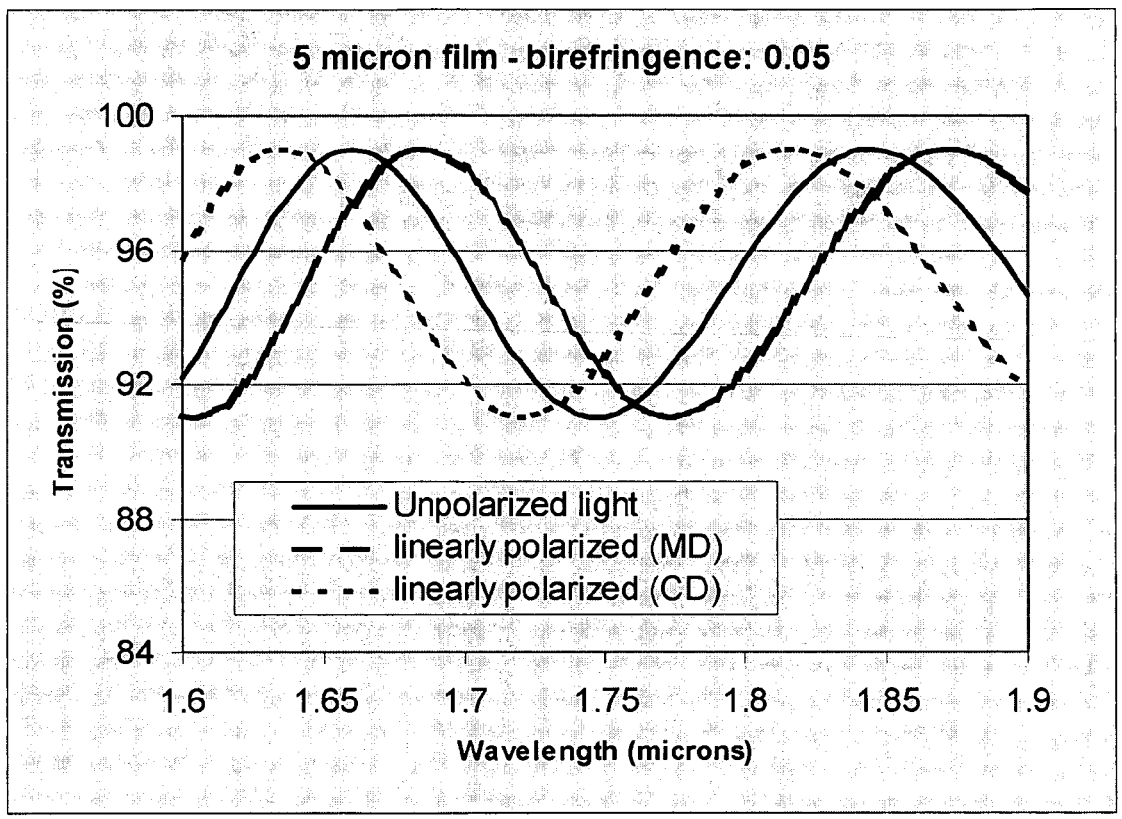
FIG. 12 is a graph of percentage of transmission vs. wavelength that shows the predicted change in interference fringes of a 5 micron thick MYLAR film using unpolarized and linearly polarized light, assuming a birefringence of 0.05.

FIG. 12 shows the predicted change in the interference fringes of a 5 µm thick MYLAR film when employing unpolarized light and linearly polarized light in accordance of the present invention.

The foregoing description of preferred embodiments of the present invention has been provided for the purposes of illustration and description. It is not intended to be exhaustive or to limit the invention to the precise forms disclosed. Many embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

What is claimed is:

1. A method comprising:
   creating a probe beam;
   directing the probe beam onto a film such that an output beam emerges from the film;
   positioning at least one filter in a beam path, the beam path comprising at least one of: a path of the probe beam and a path of the output beam;
   determining an intensity of the output beam at one or more wavelengths or wavelength bands; and
   utilizing differences in spectral fringes of unpolarized and linearly polarized light to determine one or more characteristics of the film, wherein the unpolarized light and the linearly polarized light are provided by the at least one filter and are associated with at least one of: the probe beam and the output beam, and wherein the spectral fringes are created in the output beam due to interaction of the probe beam with the film.

2. The method of claim 1, further comprising:
   utilizing data for energy transmitted or reflected at predetermined wavelengths or wavelength bands in a curve fitting algorithm to recover a full curve of spectral fringes and to calculate the one or more characteristics of the film.

3. The method of claim 1, wherein the probe beam is reflected from the film to form the output beam.

4. The method of claim 1, wherein the probe beam is transmitted through the film to form the output beam.

5. The method of claim 1, wherein the at least one filter comprises first and second polarizing filters, each polarizing filter being linearly polarizing.

6. The method of claim 5, wherein the first polarizing filter has a direction of linear polarization that is parallel to a machine direction and the second polarizing filter has a direction of linear polarization that is perpendicular to the machine direction, wherein the film is moving in the machine direction.

7. The method of claim 1, wherein the at least one filter comprises a neutral density filter, a first polarizing filter, and a second polarizing filter that are inserted one at a time into the beam path at a predetermined time interval.

8. The method of claim 1, wherein the at least one filter comprises a neutral density filter, a first polarizing filter, and a second polarizing filter that are inserted one at a time into the path of the probe beam at a predetermined time interval.

9. The method of claim 1, wherein the at least one filter comprises a neutral density filter, a first polarizing filter, and a second polarizing filter that are inserted one at a time into the path of the output beam at a predetermined time interval.

10. The method of claim 1, wherein an analyzer having a working spectral range of from 400 nm to 5000 nm determines the intensity of the output beam.

11. The method of claim 1, wherein the one or more characteristics comprise a thickness of the film.

12. The method of claim 1, wherein the one or more characteristics comprise a thickness profile of the film.

13. The method of claim 1, wherein the one or more characteristics comprise a basis weight of the film.

14. The method of claim 1, wherein the one or more characteristics comprise a basis weight of the film.

15. The method of claim 14, wherein the film comprises biaxial oriented polymers.

16. The method of claim 1, wherein determining the intensity of the output beam comprises detecting output beam energy in two or more wavelengths or wavelength bands simultaneously.

17. The method of claim 1, wherein determining the intensity of the output beam comprises detecting output beam energy in two or more wavelengths or wavelength bands sequentially.

18. The method of claim 1, wherein determining the intensity of the output beam comprises using a photoconductive or photovoltaic detector that comprises an element formed of material selected from the group consisting of: PbS, PbSe, InGaAs, Si, mercury cadmium telluride, InAs, Ge, and InSb.

19. The method of claim 1, wherein determining the intensity of the output beam comprises using a multi-channel detector that includes a plurality of beam splitters and a plurality of narrow bandpass filters with corresponding single element detectors.

20. The method of claim 1, further comprising:
separating the output beam into a plurality of output beams;
passing each of the plurality of output beams through a narrow bandpass filter; and
detecting and recording energy that is transmitted by each narrow bandpass filter.

21. The method of claim 1, wherein determining the intensity of the output beam comprises using a spectrometer.

22. The method of claim 21, further comprising positioning the at least one filter in the path of the output beam before the output beam enters the spectrometer.

23. The method of claim 1, wherein the at least one filter comprises a neutral density filter, a first linear polarizing filter, and a second linear polarizing filter.

24. The method of claim 23, wherein:
the film is moving in a machine direction;
determining to intensity of the output beam comprises using a first spectrometer, a second spectrometer, and a third spectrometer; and
the method further comprises separating the output beam into:
a first beam that passes through the first polarizing filter, wherein the first polarizing filter linearly polarizes the first beam in a direction of linear polarization that is parallel to the machine direction before the first beam enters the first spectrometer;
a second beam that passes through the second polarizing filter, wherein the second polarizing filter linearly polarizes the second beam in a direction of linear polarization that is perpendicular to the machine direction before the second beam enters the second spectrometer; and
a third beam that passes through the neutral density filter before entering the third spectrometer.

25. The method of claim 1, wherein determining the intensity of the output beam comprises using a sensor assembly having a central column and a plurality of channels, each channel comprising a lens and a detector.

26. A system comprising:
a source of radiation operable to create a probe beam that is directed onto a film;
an analyzer operable to determine an intensity of an output beam that emerges from the film at one or more wavelengths or wavelength bands;
at least one filter located in a beam path, the beam path comprising at least one of: a path of the probe beam and a path of the output beam; and
a calculation unit operable to utilize differences in spectral fringes of unpolarized light and linearly polarized light to determine one or more characteristics of the film;
wherein the at least one filter is operable to provide the unpolarized light and the linearly polarized light, the unpolarized light and the linearly polarized light associated with at least one of: the probe beam and the output beam; and
wherein the spectral fringes are created in the output beam due to interaction of the probe beam with the film.

27. The system of claim 26, wherein the calculation unit is further operable to use data for energy transmitted or reflected at predetermined wavelengths or wavelength bands in a curve fitting algorithm to recover a full curve of spectral fringes and to calculate the one or more characteristics of the film.

28. The system of claim 26, wherein the probe beam is reflected from the film to form the output beam.

29. The system of claim 26, wherein the probe beam is transmitted through the film to from the output beam.

30. The system of claim 26, wherein the at least one filter comprises first and second polarizing filters, each polarizing filter being linearly polarizing.

31. The system of claim 30, wherein the first polarizing filter has a direction of linear polarization that is parallel to a machine direction and the second polarizing filter has a direction of linear polarization that is perpendicular to the machine direction, wherein the film is associated with movement in the machine direction.

32. The system of claim 26, wherein the at least one filter comprises a first polarizing filter, a second polarizing filter, and a neutral density filter that are inserted one at a time into the beam path at a predetermined time interval.

33. The system of claim 26, wherein the at least one filter comprises a first polarizing filter, a second polarizing filter, and a neutral density filter that are inserted one at a time into the path of the probe beam at a predetermined time interval.

34. The system of claim 26, wherein the at least one filter comprises a first polarizing filter, a second polarizing filter, and a neutral density filter that are inserted one at a time into the path of the output beam at a predetermined time interval.

35. The system of claim 26, wherein the analyzer has a working spectral range of from 400 nm to 5000 nm.

36. The system of claim 26, wherein the one or more characteristics comprise a thickness of the film.

37. The system of claim 26, wherein the one or more characteristics comprise a thickness profile of the film.

38. The system of claim 26, wherein the one or more characteristics comprise a basis weight of the film.

39. The system of claim 26, wherein the one or more characteristics comprise an in-plane birefringence of the film.

40. The system of claim 39, wherein the film comprises biaxial oriented polymers.

41. The system of claim 26, wherein the analyzer is operable to detect output beam energy in two or more wavelengths or wavelength bands simultaneously.

42. The system of claim 26, wherein the analyzer is operable to detect output beam energy in two ore more wavelengths or wavelength bands sequentially.

43. The system of claim 26, wherein the analyzer includes a photoconductive or photovoltaic detector that comprises an element formed of material selected from the group consisting of: PbS, PbSe, InGaAs, Si, mercury cadmium telluride, InAs, Ge, and InSb.

44. The system of claim 26, wherein the analyzer comprises a multi-channel detector that includes a plurality of beam splitters and a plurality of narrow bandpass filters with corresponding single element detectors.

45. The system of claim 26, wherein the analyzer comprises:
one or more beam splitters operable to separate the output beam into a plurality of output beams;
two or more narrow bandpass filters, each filter operable to receive one of the plurality of output beams; and
two or more detectors operable to detect and record energy that is transmitted by the narrow bandpass filters.

46. The system of claim 26, wherein the analyzer comprises a spectrometer.

47. The system of claim 46, wherein the at least one filter comprises a first polarizing filter, a second polarizing filter, and a neutral density filter that are positioned in the path of the output beam before the output beam enters the spectrometer.

48. The system of claim 26, wherein the at least one filter comprises a neutral density filter, a first linear polarizing filter, and a second linear polarizing filter.

49. The system of claim 48, wherein:
the film is associated with movement in a machine direction;
the analyzer comprises a first spectrometer, a second spectrometer, and a third spectrometer, and
the system further comprises one or more beam splitters operable to separate the output beam into:
a first beam directed towards the first polarizing filter, the first polarizing filter operable to linearly polarize the first beam in a direction of linear polarization that is parallel to the machine direction before the first beam enters the first spectrometer
a second beam directed towards the second polarizing filter, the second polarizing filter operable to linearly polarize the second beam in a direction of linear polarization that is perpendicular to the machine direction before the second beam enters the second spectrometer; and
a third beam directed towards the neutral density filter before entering the third spectrometer.

50. The system of claim 26, wherein the analyzer comprises a sensor assembly having a central column and a plurality of channels, each channel comprising a lens and a detector.

51. A method comprising:
directing a probe beam onto a film to produce an output beam;
splitting the output beam into first, second, and third beams;
filtering the first beam using a first polarizing filter, the first polarizing filter linearly polarizing the first beam in a first direction;
filtering the second beam using a second polarizing filter, the second polarizing filter linearly polarizing the second beam in a second direction that is perpendicular to the first direction;
filtering the third beam using a neutral density filter,
measuring intensities of the first, second, and third filtered beams; and
determining one or more characteristics of the film by utilizing the measured intensities to identify differences in spectral fringes of unpolarized light and linearly polarized light,
wherein the spectral fringes are created in the output beam due to interaction of the probe beam with the film.

* * * * *

UNITED STATES PATENT AND TRADEMARK OFFICE
CERTIFICATE OF CORRECTION

PATENT NO.       : 7,298,492 B2
APPLICATION NO.  : 11/025132
DATED            : November 20, 2007
INVENTOR(S)      : Sebastien Tixier It is certified that error appears in the above-identified patent and that said Letters Patent is hereby corrected as shown below:

In Column 10, line 39, after "unpolarized" add --light--;
In Column 11, line 21, delete "a basis weight" and add --an in-place birefringence--;
In Column 12, line 44, delete "from" and add --form--.

Signed and Sealed this

Eighth Day of April, 2008

JON W. DUDAS
*Director of the United States Patent and Trademark Office*